(No Model.)
J. E. WOLF.
ADJUSTABLE ATTACHMENT FOR THRASHING MACHINE SHOES.
No. 541,195. Patented June 18, 1895.
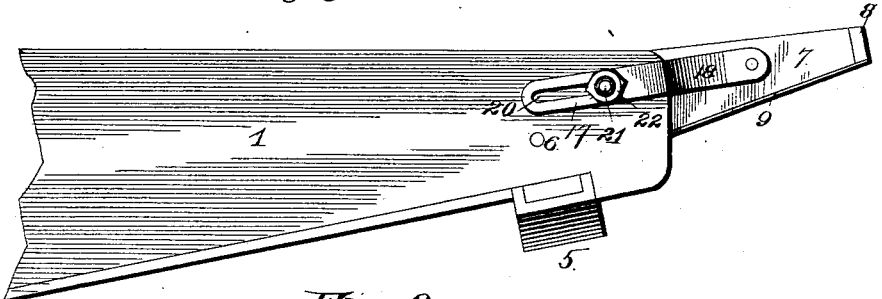
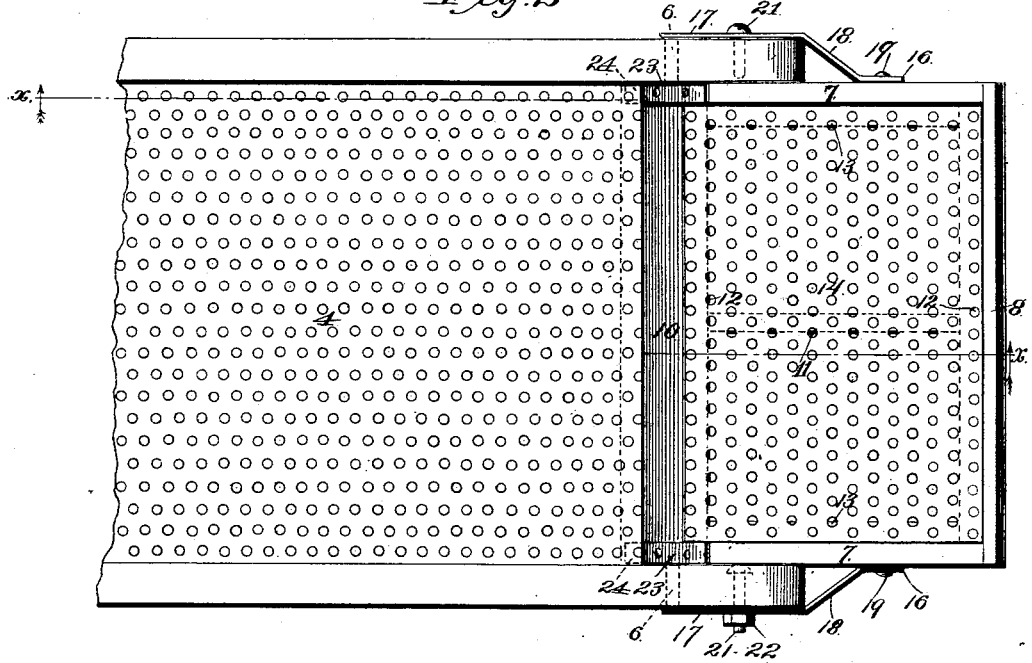
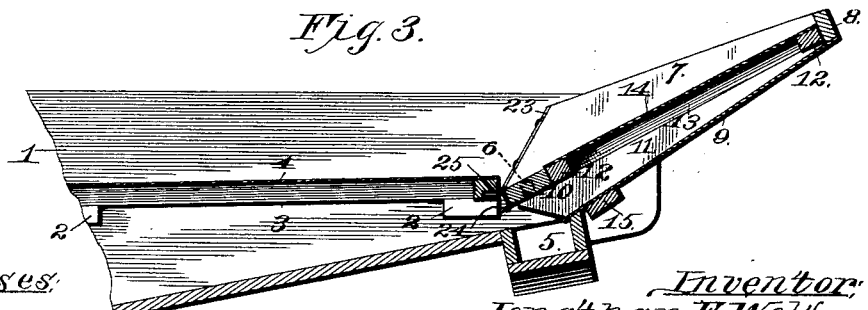
Witnesses:
Inventor
Jonathan E. Wolf
By Higdon & Higdon,
Attys.

UNITED STATES PATENT OFFICE.

JONATHAN E. WOLF, OF WELDA, KANSAS.

ADJUSTABLE ATTACHMENT FOR THRASHING-MACHINE SHOES.

SPECIFICATION forming part of Letters Patent No. 541,195, dated June 18, 1895.

Application filed November 5, 1894. Serial No. 527,942. (No model.)

*To all whom it may concern:*

Be it known that I, JONATHAN E. WOLF, of Welda, Anderson county, Kansas, have invented certain new and useful Improvements in Adjustable Screening Attachments for Thrashing-Machines, of which the following is a full, clear, and exact description, reference being had to the accompanying drawings, forming a part hereof.

My invention has relation to thrashing machines, and more particularly to the shoes thereof, and the object of the same is to provide an adjustable screening attachment which will delay the discharge of the chaff and coarse stuff until the grain is thoroughly separated therefrom and on its way to the feed-spout leading to the conveyer.

With this object in view, the invention consists in certain novel and peculiar features of construction and combinations of parts, as will be hereinafter described and claimed.

In order that the invention may be fully understood, I will proceed to describe it with reference to the accompanying drawings, in which—

Figure 1 is a side elevation of the rear portion of a thrashing-machine shoe provided with an attachment constructed in accordance with my invention. Fig. 2 is a top plan view of the same. Fig. 3 is a vertical sectional view taken on the line $x\ x$ of Fig. 2.

In the said drawings, 1 designates the shoe of a thrashing-machine, and 2 cleats secured to the inner sides of the same, upon which rests the frame 3 of the grain-sieve 4, of the usual foraminous construction, it being shown as of perforated sheet-metal. Extending transversely of said shoe and communicating therewith, is the feed-spout 5, the bottom of which extends at an angle to a horizontal plane, and said feed-spout, at its lower end, communicates with the elevator of the thrashing-machine (not shown), in the ordinary manner. Pivotally mounted at 6 upon and within the discharge end of the said shoe, is my screening attachment, the framework of which consists of side-bars 7, connected at their rear ends by the bar 8, at their lower margin by the bottom 9, preferably of sheet metal, and at their rear ends, and in line with the pivotal point 6, by the transversely extending bar 10. Said bars 10 and 8 are connected by the longitudinally extending bar or bars 11, which rest upon the bottom 9, and resting upon the said bar or bars 11, and between the bars 8 and 10, is a detachable rectangular frame comprising transverse bars 12 and end-bars 13, which are connected by a sieve 14 of any suitable foraminous material, preferably of perforated sheet-metal, as shown. The front end of the bottom 9 projects inward of the rear wall of the feed-spout, and is provided at its under side with a shoulder or stop in the form of a bar or block 15, which bears against the outer side and upper margin of the rear wall of said feed-spout when the attachment occupies its normal or lowered position. The attachment occupies this position when thrashing heavy or damp grain, or when thrashing slowly. In order that the attachment may be pivotally raised and held at any desired point in its adjustment, I provide a pair of metallic plates, comprising the parallel portions 16 and 17, and the obliquely extending portions 18. The portions 16 of these attachments are secured at opposite sides to the side-bars 7 of the attachment, as shown at 19. The portions 17, which fit snugly against the sides of the shoe, are longitudinally slotted, as shown at 20, and projecting through said slots and carried by the shoe, are the screw-bolts 21. One of these bolts has its threaded end projecting outwardly, and is engaged by a clamping-nut 22.

It will be apparent from this construction, that by loosening said nut the attachment may be pivotally raised from its normal position, or lowered to its normal position, and that by the proper operation of said nut it may be clamped firmly at any angle in its adjustment to the plane of the sieve 4.

When the attachment occupies its normal position, and the stop 15 bears against the feed-spout, it will be apparent that the attachment will be supported without the aid of the clamping-nut, but will not be held from moving upward should pressure accidentally or otherwise be applied to its under side. To prevent the accidental raising of the screening attachment, when in its normal position, I provide the metallic strips 23, which are secured to the inner end of the bars 7, and are stepped at their lower ends to form the tongues 24. These tongues normally project horizontally, and engage grooves 25 in the end-bar of the frame of the sieve 4. When in this position, it will be apparent that it will be impossible for the attachment to be pivotally operated downward because of the stop 15, and upward because the sieve-frame rests upon the rigid cleats 2. When it is desired to elevate said attachment the sieve-frame is moved longitudinally until the tongues and grooves are disengaged. It may then be elevated and the sieve-frame moved back to its original and normal position; this relation being shown clearly in Fig. 3.

In the operation of the machine, the grain and chaff descend upon the sieve of the shoe, and is carried forward in the ordinary manner. Rapid thrashing with machines not provided with my screening attachment usually results in a waste of grain, particularly when the grain is light, by its being blown over the shoe with the chaff. With my attachment in position it will be practically impossible for any considerable amount of grain to be wasted in this manner, because if a quantity of grain is blown with the chaff beyond the end of the sieve 4 of the shoe it will be caught by the sieve of the attachment, which will be elevated or inclined relatively to the sieve 4 more or less, accordingly as the grain is light or heavy, and the grain passing through the sieve 14 will be deflected by the inclined bottom 9, into the feed-spout 5. By pivotally mounting my screening attachment in the manner shown, it will also be apparent that it will not be in the way of a straw-stacker, as it can be thrown pivotally nearly or about to a vertical position, and will therefore be out of the way. To accommodate this movement the slots 20 are provided, and are of length approximating the distance between the pivotal points 6 and the bolts 21.

It will be understood, of course, that if found necessary the threaded ends of both bolts 21 may project outwardly, and each be engaged by a clamping-nut 22, or a hand-wheel may be employed in the place of the nut 22, so that the attachment may be clamped without the aid of a wrench.

From the above description, it will be apparent that I have produced an adjustable attachment for thrashing-machine shoes, which is positive and reliable in operation, is easily manipulated, and is simple, strong, durable, and comparatively inexpensive of construction.

Having thus described my invention, what I claim as new, and desire to secure by Letters Patent, is—

1. The combination with the shoe of a thrashing-machine, provided with a detachable sieve mounted upon the frame, having grooves in its front end and supported upon cleats, and the feed-spout, of an adjustable attachment pivoted within the discharge end of the shoe and provided with a sieve, plates secured to said attachment and stepped to form tongues which engage the grooves of said sieve-frame, substantially as set forth.

2. The combination with the shoe of a thrashing-machine, provided with a detachable sieve mounted upon the frame, having grooves in its front end and supported upon cleats, and the feed-spout, of an adjustable attachment pivoted within the discharge end of the shoe and provided with a sieve, plates secured to said attachment, and stepped to form tongues which engage the grooves of said sieve-frame, and a stop secured to the bottom of said attachment and bearing against the feed-spout, substantially as set forth.

In testimony whereof I affix my signature in the presence of two witnesses.

JONATHAN E. WOLF.

Witnesses:
 GEO. ADAMSON,
 WILLARD MARPLE.